March 15, 1966    J. D. MITCHELL ETAL    3,240,550
MOTION PICTURE APPARATUS WITH AUTOMATIC REWIND
Filed Aug. 20, 1962    6 Sheets-Sheet 1

JOHN D. MITCHELL
KENNETH W. THOMSON
MORRIS E. BROWN
INVENTORS

BY *R. Frank Smith*

*Earl T. Claremon*
ATTORNEYS

March 15, 1966 J. D. MITCHELL ETAL 3,240,550
MOTION PICTURE APPARATUS WITH AUTOMATIC REWIND
Filed Aug. 20, 1962 6 Sheets-Sheet 2

JOHN D. MITCHELL
KENNETH W. THOMSON
MORRIS E. BROWN
INVENTORS

BY
ATTORNEYS

JOHN D. MITCHELL
KENNETH W. THOMSON
MORRIS E. BROWN
INVENTORS

March 15, 1966  J. D. MITCHELL ETAL  3,240,550
MOTION PICTURE APPARATUS WITH AUTOMATIC REWIND
Filed Aug. 20, 1962  6 Sheets-Sheet 4

JOHN D. MITCHELL
KENNETH W. THOMSON
MORRIS E. BROWN
INVENTORS

BY R. Frank Smith

ATTORNEYS

March 15, 1966 J. D. MITCHELL ETAL 3,240,550
MOTION PICTURE APPARATUS WITH AUTOMATIC REWIND
Filed Aug. 20, 1962 6 Sheets-Sheet 6

JOHN D. MITCHELL
KENNETH W. THOMSON
MORRIS E. BROWN
INVENTORS

BY

ATTORNEYS

United States Patent Office 3,240,550
Patented Mar. 15, 1966

3,240,550
MOTION PICTURE APPARATUS WITH
AUTOMATIC REWIND
John D. Mitchell, Kenneth W. Thomson, and Morris E. Brown, Rochester, N.Y., assignors to Eastman Kodak Company, Rochester, N.Y., a corporation of New Jersey
Filed Aug. 20, 1962, Ser. No. 218,492
14 Claims. (Cl. 352—124)

The present invention relates to cinematographic apparatus and more particularly to a film feeding and automatic rewind mechanism for a motion-picture projector.

In motion-picture apparatus, particularly motion-picture projectors, it is customary to provide mechanism to move the film at normal forward and reverse projection speeds as well as to hold it in a stationary position in the film gate for the projection of "stills." In addition, it is also desirable to rewind the film at high speed onto the supply reel once the entire film, or a selected portion thereof, has been projected.

It is an object of the present invention to provide cinematographic apparatus with an automatic rewinding mechanism for returning to the supply reel, at high speed, film wound on the take-up reel.

Another object of this invention is to provide cinematographic apparatus with automatic mechanism that permits film wound upon the take-up reel to be returned to the supply reel without substantially altering the threaded path of the film from the supply reel to the take-up reel.

Still another object of the present invention is to provide a motion-picture projector with mechanism which is automatically actuated when all of the filmstrip has been projected to rewind the filmstrip onto the supply reel.

A further object of this invention is to provide cinematographic apparatus with an automatic high-speed rewind mechanism, which mechanism is driven from the same unidirectional power source that, during projection, actuates the forward drive mechanism.

Still another object of the present invention is to provide cinematographic apparatus with an automatic rewind mechanism which, upon completion of the rewind cycle, disengages the rewind mechanism and resets the operative mechanisms for another projection cycle.

Other objects and a fuller understanding of the invention can be had by referring to the following description and claims taken in conjunction with the accompanying drawings in which:

In order to facilitate the understanding of the operation and construction of the apparatus, a brief summary of the device will be helpful. A perforated filmstrip, secured at its trailer end to a supply reel core, is guided and threaded in a path from the supply reel, through a gate and pulldown mechanism to a take-up reel. A filmstrip tension-sensing device, over which the filmstrip passes, is positioned adjacent the film path between the supply reel and gate. A second sensor device is positioned adjacent to the path of the filmstrip intermediate the gate and the take-up reel to sense the presence of a filmstrip in the path.

The projector is energized by suitable controls actuated by the operator to drive the filmstrip from the supply reel to the take-up reel. When the end of the filmstrip is reached, the pulldown mechanism continues to feed film past the gate; and, because the trailer end of the filmstrip is secured to the supply reel core, the filmstrip between the supply reel core and the gate is drawn taut thus tripping the tension-sensing device which unlatches a spring-loaded rewind control mechanism to automatically place the projector in the REWIND mode.

In the REWIND mode, in which the power drive is not reversed, the filmstrip is rapidly returned through the same path, including the gate, onto the supply reel. As the leader end of the filmstrip passes the second mentioned film-sensor device, the sensor actuates mechanism for returning the rewind control mechanism to its latched position and also for returning the projector control handle to the OFF position so that the projector is ready to repeat the same sequence of operation.

Figure 1:
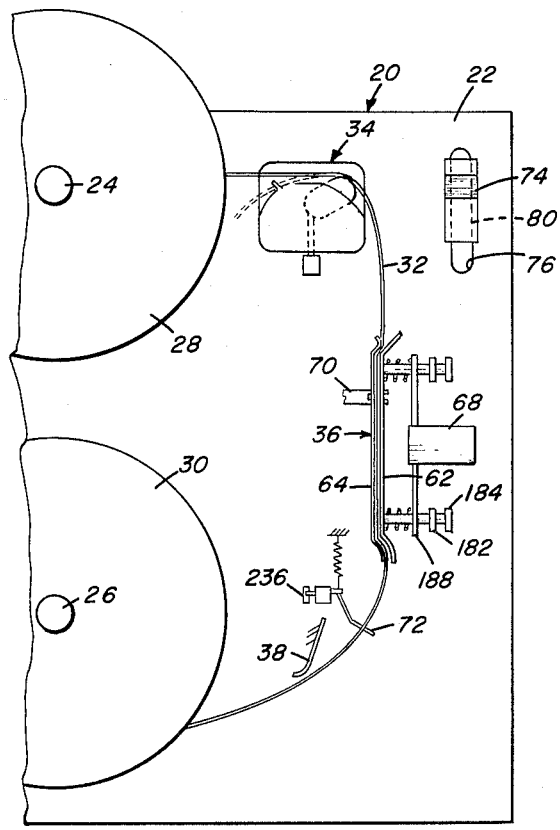
FIG. 1 is a fragmentary, partially schematic side-elevation view of a projector incorporating our invention.
Figure 2:
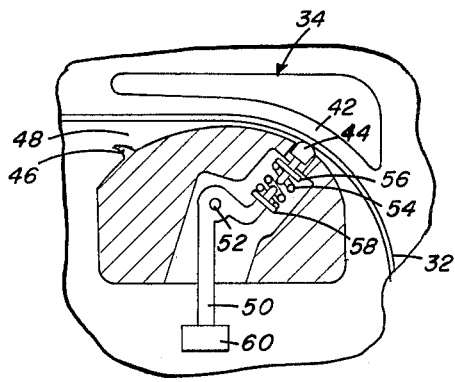
FIG. 2 is an enlarged sectional view of the filmstrip tension sensing device shown in FIG. 1.

Referring more particularly to FIGS. 1 and 2 of the drawings, there is shown a motion picture projector housing 20 having a sidewall 22 from which a pair of spaced rotatable spindles 24 and 26 project, to carry thereon supply reel 28 and take-up reel 30 respectively. Each of spindles 24 and 26 has a one-way drive clutch mechanism for allowing free rotation of its respective spindle when the spindle is rotating in the direction for unwinding the filmstrip and coupling the spindle to a power drive when the spindle is rotating in the direction for winding the filmstrip. A perforated filmstrip 32 which is fastened to the core of supply reel 28, passes through a channeled tension sensing device 34 to a projection gate 36 and thence over a spring snubber 38 to take-up reel 30 on the spindle 26.

Tension sensing device 34 shown in FIG. 2 includes a side opening guideway 42 which directs filmstrip 32 over a predetermined spring tension snubber 44. A single prong 46 is formed on the lower surface of the entrance of an enlarged portion 48 of guideway 42 and is adapted to project upwardly to engage a perforation of filmstrip 32 if the path of the filmstrip sags below its normal path. A pivotal bell crank lever 50 is carried by a journaled shaft 52 extending through sidewall 22. A helical compression spring 54 extends between shoulders 56 and 58 of snubber 44 and bell crank 50, respectively, to urge snubber 44 towards the path of filmstrip 32. When filmstrip 32 is drawn taut between supply reel 28 and gate 36, it will depress snubber 44 to overcome the bias of spring 54, after which snubber 44 engages and moves bell crank 50 in a clockwise direction (as viewed in FIG. 1) about the axis of its shaft 52, rotating the latter. Similarly, handle 60 of bell crank 50 can be moved manually to simulate the actuation of snubber 44.

Gate 36 includes a pressure pad 62, aperture plate 64, and optical system 68, and has associated therewith a conventional pulldown mechanism 70 fragmentarily shown. A film sensor 72, for sensing the presence of the filmstrip 32 is located along that portion of the path of filmstrip 32 intermediate gate 36 and take-up reel 30. Certain of the mechanism described hereinabove is particularly applicable to a sprocketless projector and constitutes no part of the present invention except insofar as it acts in combination with the take-up and rewind mechanism now to be described.

Figure 4:
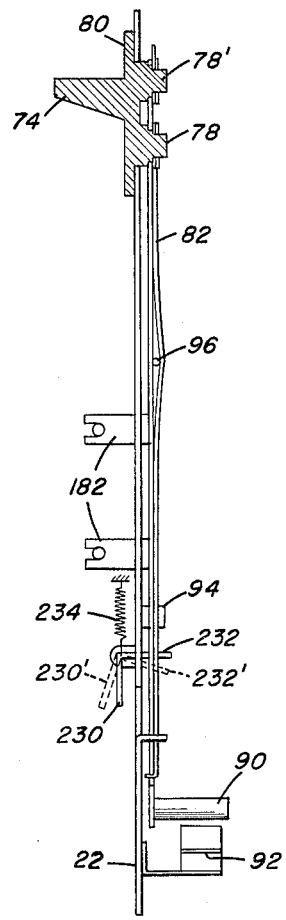
FIG. 4 is a partial end view of the control mechanism shown in FIG. 3 taken along the line 4—4.
Figure 3:
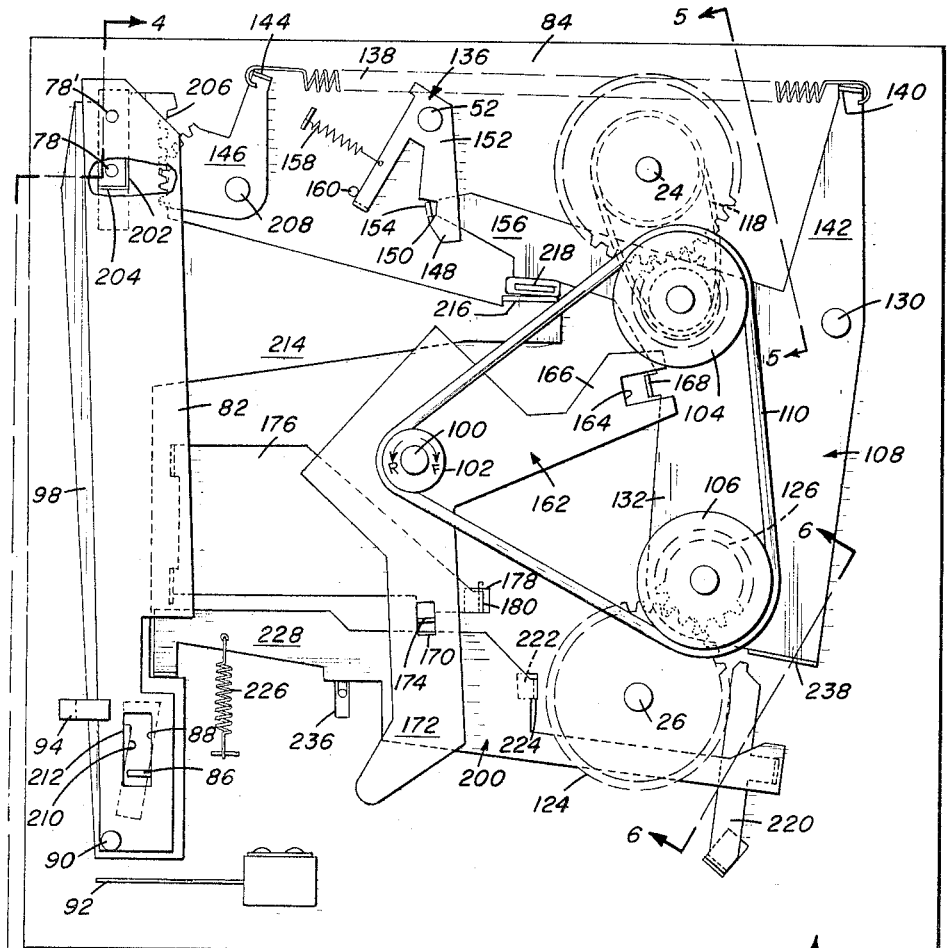
FIG. 3 is an elevation view of the control mechanism mounted on the rear side of the sidewall of the projector shown in FIG. 1 showing the control mechanism in the OFF position.

A start handle 74, adapted for vertical movement in slot 76, controls the energization of the projector. As best illustrated in FIGS. 3 and 4, a pair of vertically spaced protuberances 78 and 78′ are integrally formed with slide portion 80 of start handle 74, and are adapted to project through slot 76 in sidewall 22. Protuberances 78 and 78′ are fastened to an elongated control bar 82, which is mounted for vertical, longitudinal movement adjacent one edge of the rear face 84 of sidewall 22.

An ear 86 pressed inwardly from face 84 of sidewall 22 engages a slot 88 in control bar 82 to guide the vertical displacement of the control bar. An insulated pin 90 is mounted on the lowermost portion of control bar 82 in position to engage and actuate a motor control switch 92 when control bar 82 is moved downwardly, to thereby cause operation of the projector drive motor (not shown).

In order to provide a friction detent to hold control bar 82 in either position, control bar 82 is made of spring material and its lower end is arranged to slidably engage a guide bracket 94 which prevents it from swinging inwardly away from face 84. A small steel ball 96 is interposed between the middle portion of control bar 82 and a reset slide 98, which is positioned between control bar 82 and face 84 of sidewall 22 and which will be described in detail hereinafter. Thus ball 96 causes control bar 82 to be bowed slightly so as to be urged against bracket 94 and thus be frictionally retained in position.

As is best shown in FIG. 3, a journaled drive shaft 100 which is centrally disposed relative to face 84 has a driven pulley 102 secured thereto for rotation. A reversible drive, not shown, and the details of which have no bearing on the present invention but which has the characteristic of a uniform speed in the forward (F) or reverse (R) direction, applies rotational power from the projector motor to drive shaft 100 and drive pulley 102. The pulldown mechanism, shown in FIG. 1, and a shutter (not shown) are driven from shaft 100 in a manner well known in the prior art and which likewise has no bearing on the present invention. Idler pulleys 104 and 106 carried by a shiftable gear carrier plate 108 are drivingly coupled to driven pulley 102 by a flexible extensible belt 110.

Figures 5, 6:
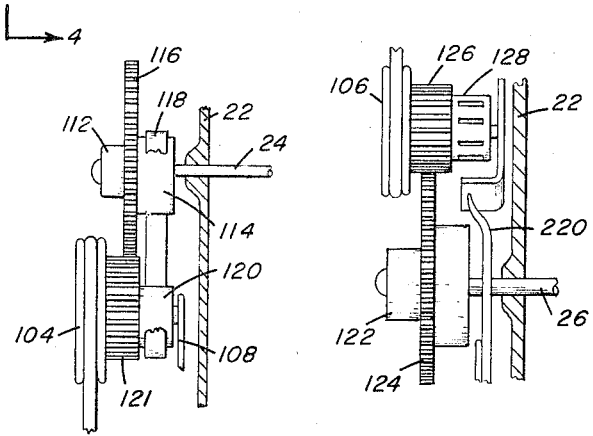
FIG. 5 is a fragmentary sectional view taken on the line 5—5 of FIG. 3.
FIG. 6 is a similar view taken on the line 6—6 of FIG. 3.

As best illustrated in FIGS. 3 and 5, a conventional one-way circular drive clutch mechanism 112 which has a hub 114 is secured to that portion of supply spindle 24 projecting inwardly of face 84 of sidewall 22. It should be particularly noted that drive clutch 112, whose mechanism is now shown, allows spindles 24 to freely rotate when a filmstrip is being unwound from the supply reel (counterclockwise direction as viewed in FIG. 3), but drivingly rotates spindle 24 when a filmstrip is being wound onto the supply reel (clockwise direction as viewed in FIG. 3). A driven gear 116 is concentrically secured to drive clutch 112 for rotation therewith while idler pulley 104 includes a coaxially mounted pinion gear 121 and a hub 120. As is later explained in detail, driven gear 116 is adapted to be coupled to pinion gear 121 for rotation therewith to positively drive supply spindle 24 in a clockwise direction (FIG. 3) during REVERSE projection, while a belt 118 which normally rides loosely on hub 114 of drive clutch 112 and on hub 120 of pulley 104 is adapted to be selectively tensioned to drive the supply spindle in the same direction, but at higher speed, during REWIND.

Similarly, as shown in FIGS. 3 and 6, a one-way circular drive clutch mechanism 122 is secured to that portion of take-up spindle 26 projecting inwardly of face 84 of sidewall 22. Here again it should be noted that drive clutch 122, whose operative mechanism is not shown, allows spindle 26 to freely rotate when a filmstrip is being unwound from the take-up reel (clockwise direction as viewed in FIG. 3), but drivingly rotates spindle 26 when a filmstrip is being wound onto the take-up reel (counterclockwise direction as viewed in FIG. 3). A driven gear 124 is concentrically secured to drive clutch 122 for rotation therewith while idler pulley 106 includes a coaxially mounted pinion gear 126 and a ratchet wheel 128. As is later explained in detail, driven gear 124 is adapted to be coupled to pinion gear 126 for rotation therewith to positively drive take-up spindle 26 during FORWARD projection while the ratchet 128 serves to power the reset operation when REWIND is complete.

Selective control of the drive system for spindles 24 and 26 is obtained by shifting gear carrier plate 108 which, as shown in FIG. 3, is pivotally mounted on pivot pin 130 projecting inwardly from face 84 of sidewall 22. The idler pulleys 104 and 106 are rotatably mounted on substantially opposite ends of web portion 132 of gear carrier plate 108. Hence when gear carrier plate 108 is rotated in a counterclockwise direction about pin 130, pinion gear 121 of idler pulley 104 will be swung away and uncoupled from driven gear 116 while pinion gear 126 of idler 106 will likewise be uncoupled from driven gear 124. Such counterclockwise movement of gear carrier plate 108 will also cause non-extensible belt 118 to be drawn taut between hub 114 of drive clutch 112 and pulley wheel 120 of idler pulley 104, rendering the belt drive effective and limiting the movement of plate 108. It should also be particularly noted that the ratio of the diameter of pulley wheel 120 to that of hub 114 is greater than the ratio of the diameter of pinion gear 121 to that of driven gear 116, and hence the rotational speed of the spindle 24 when driven by belt 118 will be greater than when it is driven by gears 121 and 116.

Figure 7:
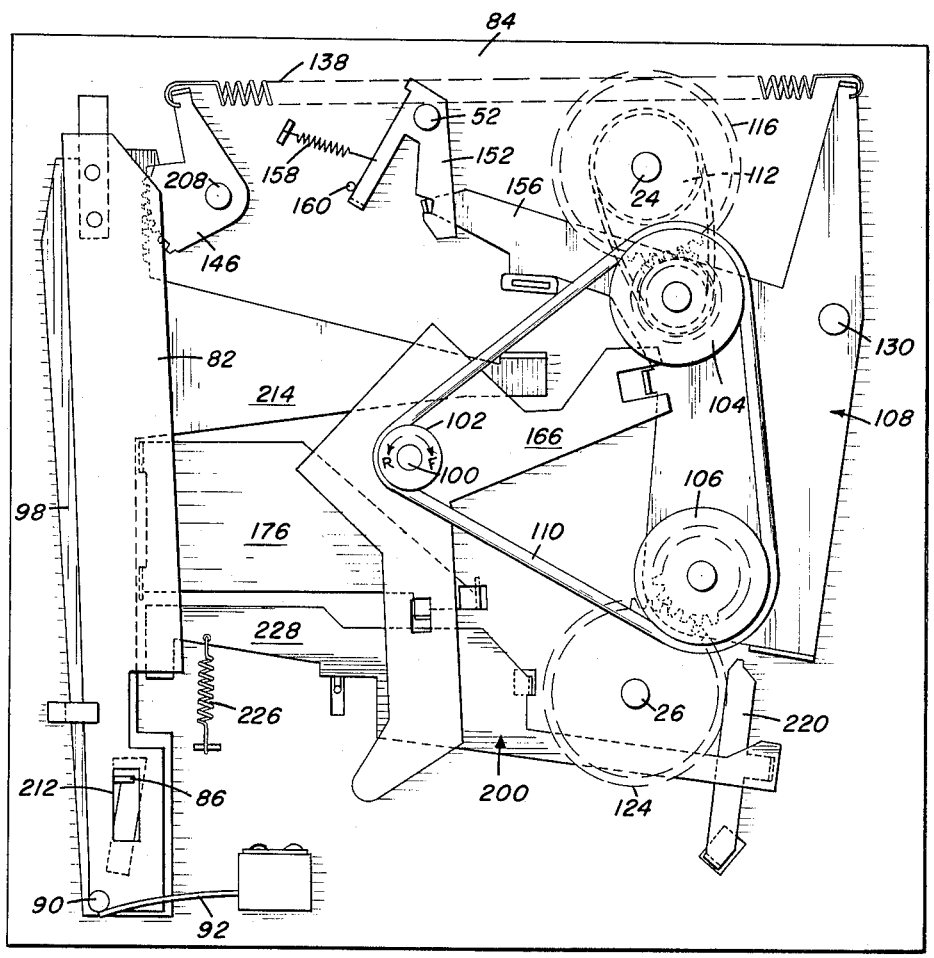
FIG. 7 is a view similar to FIG. 3 but showing the control mechanism in the position it assumes in the FORWARD or REVERSE projection position.

A latch lever 136, controlled by the tension sensing device 34, normally holds gear carrier plate 108 in its clockwise-shifted position shown in FIGS. 3 and 7 against the action of a tension spring 138 extending between a lug 140 on arm 142 of gear carrier plate 108 and a lug 144 on a gear sector 146 to be later described.

Latch lever 136 is secured to the inner end of the previously described journaled shaft 52 of the tension sensing device 34 for rotation therewith. A cam surface 148 and a detent 150 are located adjacent the free end of arm 152 of lever 136, and are adapted to engage and retain a lug 154 carried by an arm 156 of gear carrier plate 108. A spring 158 normally urges lever 136 in a clockwise direction about shaft 52 and into engagement with a pin 160 projecting inwardly from face 84.

Since, as will later be explained, the drive shaft 100 is neither stopped nor reversed when plate 108 is unlatched to start a REWIND operation, the film pulldown claws will continue to operate as during forward projection. It is therefore necessary to provide means for disengaging the film therefrom, to prevent damage to the film during such rewind. This result is automatically obtained by the following mechanism.

A bell crank 162 is mounted for pivotal movement about the axis of drive shaft 100. An open ended slot 164 is located in the outermost end of arm 166 of bell crank 162 and is adapted to co-operate with a lug 168 on gear carrier plate 108. An elongated slot 170 is provided in the other arm 172 intermediate the length thereof. This slot 170 coacts with a lug 174 projecting from a gate actuating bracket 176 mounted for lateral sliding movement on plate 22 so that rotational movement of bell crank 162 will be translated into lateral movement of gate bracket 176.

Figure 10:
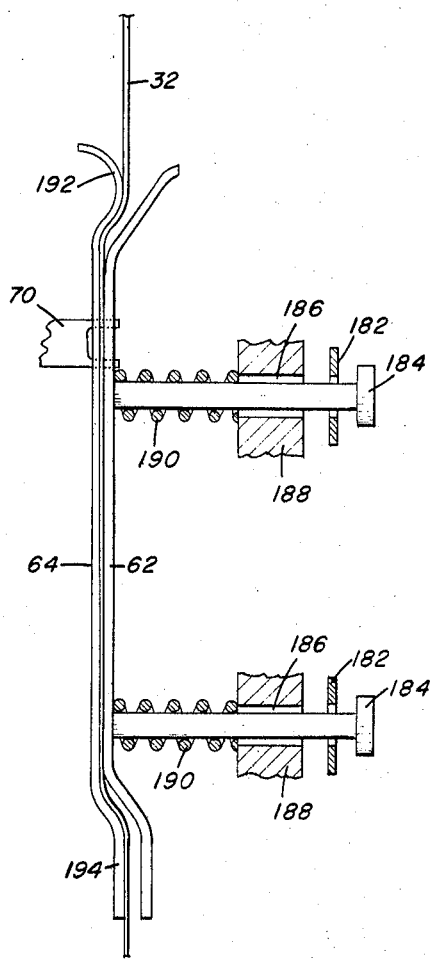
FIG. 10 is an enlarged side-elevation view partly in cross-section illustrating the film gate in the closed position for projection; and, FIG. 11 is a view similar to FIG. 10 illustrating the film gate in the open position which it assumes for the REWIND operation.
Figure 11:
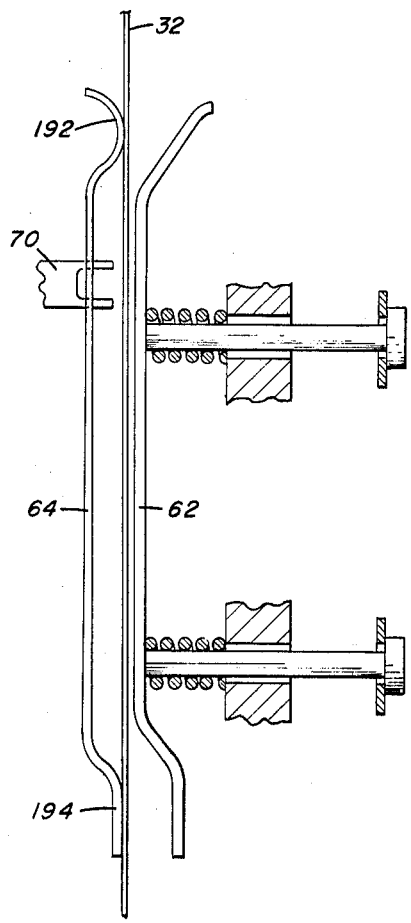

Gate bracket 176 is mounted by an ear 178 in a slot 180 formed in plate 22 and by two spaced and slotted fingers 182 formed on the forward end of the gate bracket and which project through suitable slots in sidewall 22 and into engagement with headed pins 184 forming part of the pressure pad 62 of the gate assembly (see FIGS. 10 and 11).

As shown in FIGS. 10 and 11, the two spaced pins 184 are secured to one side of pressure pad 62 and are adapted to extend through suitable apertures 186 formed in a stationary plate 188 secured to sidewall 22 of housing 20. Concentric helical springs 190 positioned intermediate pressure pad 62 and plate 188 urge pressure pad 62 into engagement with aperture plate 64. When fingers 182 are displaced laterally by forward movement of the gate actuating bracket 176, they will move the pressure pad 62 away from the aperture plate 64 and into the position shown in FIG. 11.

It will be noted that aperture plate 64 is provided at its ends with a pair of film guiding surfaces 192 and 194 which project forwardly from the plane of the main body of the plate. When the gate pressure pad 62 is open as in FIG. 11, these two guiding surfaces 192 and 194 tend to maintain the filmstrip 32 in the gate spaced slightly forwardly of the tips of the pulldown claw 70 so that the latter will be disengaged therefrom as shown in FIG. 11. This is the position assumed by the pressure pad 62 during REWIND.

On the other hand, when the apparatus is set for normal projection operation, the pad 62 will assume its closed position shown in FIG. 10, wherein it forces the film 32 rearwardly into engagement with aperture plate 64 between the surfaces 192 and 194 so that the filmstrip can be engaged by the pulldown claw 70.

Automatic stopping of the apparatus and reset of the control mechanism for a new cycle of operation when film rewind has been completed is controlled by film sensor 72 acting in conjunction with a shutoff lever 200 and the previously mentioned reset slide 98. As best shown in FIGS. 3 and 4, reset slide 98 is provided at its upper end with an open-ended slot 202, the lower edge 204 of which is adapted to be engaged by lower protuberance 78 upon downward movement of the start handle 74 to start the projector. Protuberances 78 and 78' are slightly smaller in diameter than the width of slot 202 to allow slide 98 to pivot slightly thereon for latching purposes as described hereinbelow. A rack 206 is formed on one edge of the upper portion of reset slide 98 and is adapted to co-operate with the previously mentioned gear sector 146, which is journaled for pivotal movement on a bearing pin 208 secured to sidewall 22. A slot 210, which has a width sufficient to accept ear 86, is located adjacent the lowermost end of reset slide 98 and is slanted relative to slot 88 in control bar 82. The upper portion of slot 210 is enlarged to form a latching detent 212 in the edge of slot 210. The arrangement is such that when control bar 82 is moved downwardly to initiate operation of the projection, reset slide 98 will likewise be forced downwardly against the tension of spring 138 and will be positively latched in its lower position by the action of latching detent 212 and ear 86. Gear sector 146 exerts an upward force on reset slide 98, which force tends to urge slide 98 in a counter-clockwise direction about the engagement of slot 202 with protuberance 78 whereby detent 212 is urged into engagement with ear 86.

Rest slide 98 has an arm 214 extending laterally therefrom which arm carries, adjacent its outer end, a lug 216 extending inwardly of face 84. Lug 216 is arranged to co-operate with a mating rubber-covered lug 218 carried by an arm 156 of gear carrier plate 108, so that upward movement of reset slide 98 at the end of the rewind operation will rotate plate 108 clockwise into its normal latched position ready for a new cycle of operation.

Again referring to FIG. 3, shutoff lever 200 having a cross arm 220 secured thereto adjacent one end is mounted on sidewall 22 for limited longitudinal sliding movement as well as limited rotational movement. The mounting therefor comprises an ear 222 on lever 200 which projects loosely through a slot 224 in sidewall 22, with the lower edge of the slot forming a fulcrum about which the lever can pivot. A light spring member 226 secured adjacent end 228 of shutoff lever 200 tends to urge lever 200 in a counterclockwise direction about this fulcrum. Upon such pivotal movement of lever 200, the upper end of cross bar 220 will move into engagement with ratchet wheel 128 on idler pulley 106 so that continued rotation thereof will force the lever 200 bodily to the left to unlatch the reset slide 98.

Film sensor 72, shown best in FIGS. 1, 3 and 4, is pivotally mounted on sidewall 22 and has a pair of arms 230 and 232, respectively, which arms are biased clockwise by a light tension spring 234 acting on film sensor 72. The normal position of arms 230 and 232 of sensor 72 is shown in full lines in FIGS. 3 and 4. So long as a filmstrip 32 extends from gate 36 to take-up reel 30, an edge thereof will engage arm 230 and hold sensor 72 in this normal position. In this condition, arm 232 will extend through slot 236 in wall 22 and prevent shutoff lever 200 from rocking counterclockwise about its fulcrum 222 to an extent sufficient to permit engagement of the tips of cross bar 220 with the ratchet 128 on idler 106. Thus lever 200 is maintained ineffective to unlatch reset slide 98 so long as film extends from the gate to the take-up reel.

Figure 8:
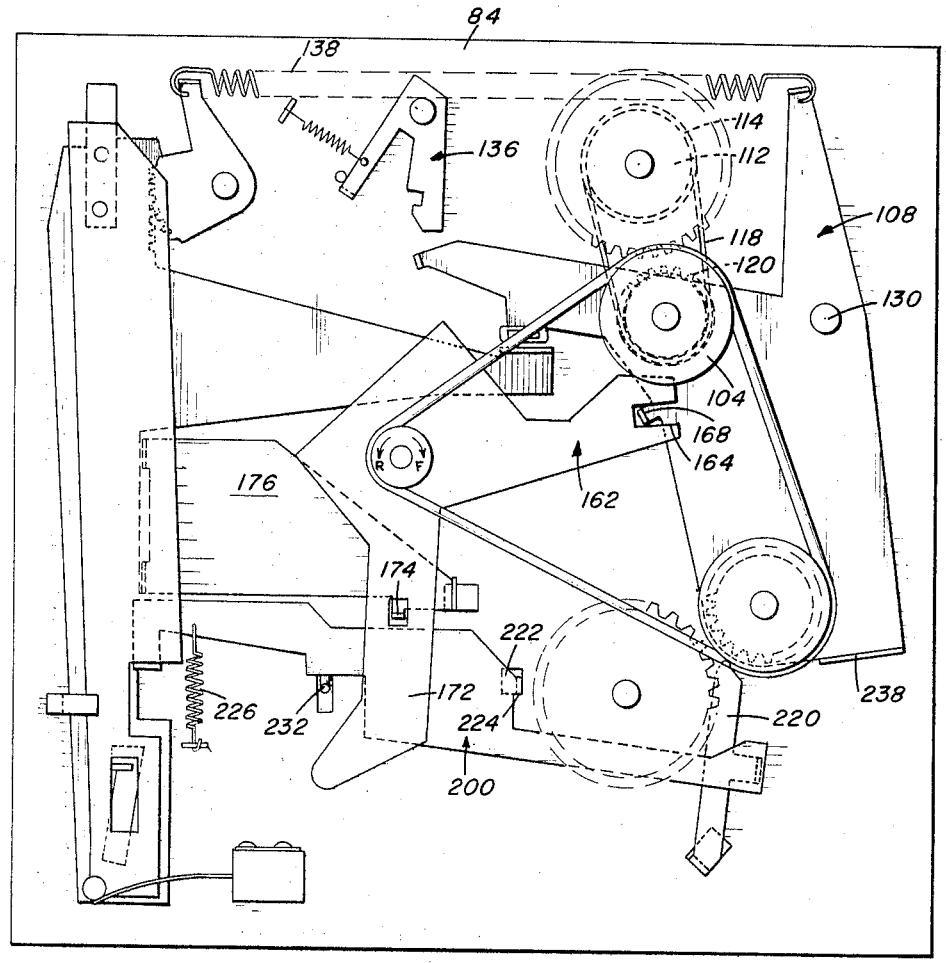
FIG. 8 is a view similar to FIG. 7 but showing the control mechanism and operating elements in the REWIND position.
Figure 9:
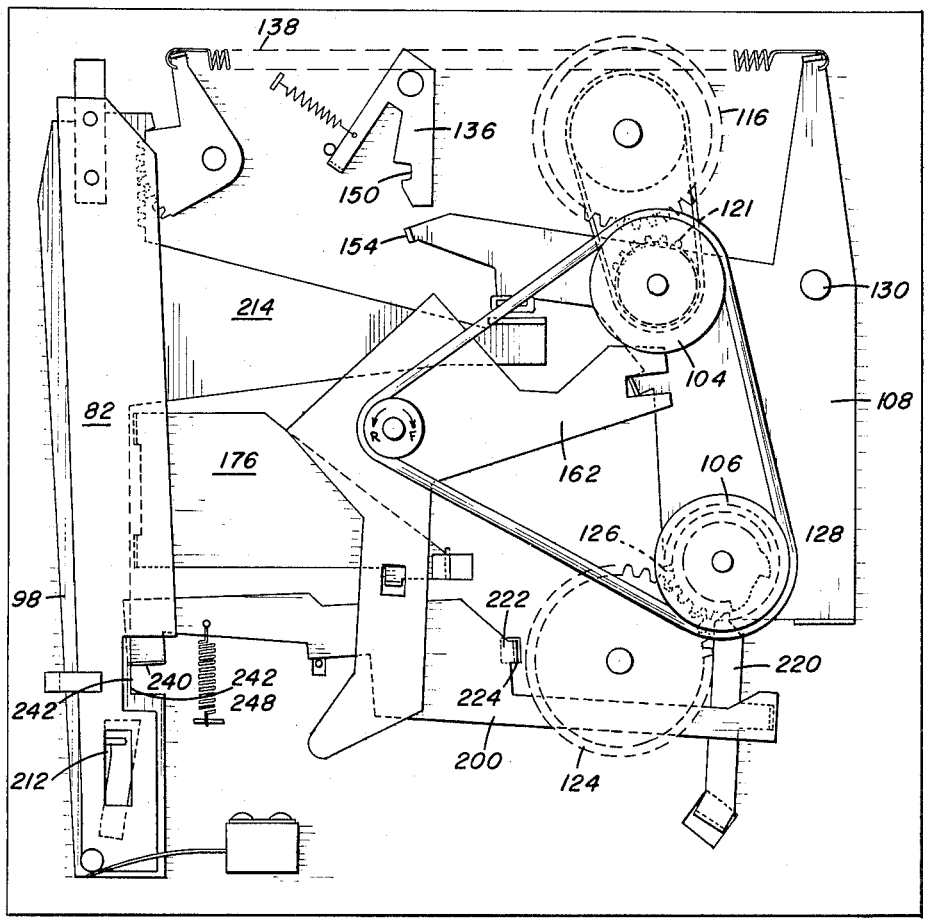
FIG. 9 is a view similar to that shown in FIG. 8 showing the control mechanism as it would appear when the filmstrip has been rewound on the supply reel but prior to the control mechanism and operating elements being returned to their OFF positions.

An additional interlock to permit actuation of lever 200 only in the event that gear carrier plate 108 has been unlatched to initiate a rewind operation, is also provided by means of a lip 238 on the lower end of gear carrier plate 108. As shown in FIG. 3, this lip is arranged to engage the upper end of the cross bar 220 to prevent it from swinging upwardly so long as the carrier plate 108 is in its latched position. However, when plate 108 has been released, lip 238 will swing out of the way of cross bar 220, as shown in FIG. 8, to place lever 200 under the control of film sensor 72.

In operation, a supply reel 28, which contains a rolled filmstrip 32 to be projected, is mounted on the supply spindle 24 and the leader end of filmstrip 32 is inserted in guideway 42 of tension-sensing device 34 and thence is threaded into the entrance of gate 36. The operator then moves start handle 74 downwardly to initiate operation of the projector in the FORWARD direction.

As best shown in FIGS. 1, 7, 8 and 9, when start handle 74 is depressed, control bar 82 is displaced downwardly and carries with it reset slide 98. Gear sector 146 is thus rotated about bearing pin 208 to increase the tension in spring 138. The reset slide 98 is latched in the down position by ear 86 engaging detent 212 which thus prevents the biased gear sector 146 from moving the reset slide 98 upwardly to its original position. Pin 90 engages the motor control switch 92 which closes contacts for an electrical circuit, not shown, which supplies power to the electric motor and projector lamp of the projector. It should be noted, however, that the operator can at any time turn the projector off, as the start handle 74 can be returned to its OFF position independently of reset slide 98 to disengage pin 90 from the switch 92.

During the projection sequence, rotational power in both the FORWARD (F) and REVERSE (R) direction can be applied to drive shaft 100 and pulley 102 and flexible belt 110 will transmit the rotational power to idler pulleys 104 and 106. As previously described idler pulleys 104 and 106 will thereupon rotate driven gears 116 and 124, respectively. However, in the FORWARD (F) direction, drive clutch 112 on supply spindle 24 does not transmit rotational movement to the supply spindle 24 and the film is actually unwound from the supply reel merely by the action of the pulldown mechanism pulling the filmstrip 32 from the supply reel. Drive clutch 122, however, transmits rotational movement to take-up spindle 26 and hence the filmstrip 32 is positively wound upon the take-up reel. Preferably an automatic threading device (not shown) is employed to thread filmstrip 32 onto take-up reel 30. It is apparent that if the powered drive to drive pulley 102 is reversed by the selective operation of the reversing mechanism (not shown) by the operator, the filmstrip will be wound upon the supply reel 28 and unwound from the take-up reel 30. As the shutter and pulldown mechanisms (not shown) are operative off the drive shaft 100, normal, forward and reverse projection actions are thus obtained.

With reference to FIGS. 1 and 8, once the end of filmstrip 32 is reached on supply reel 28, the film intermediate the supply reel 28 and gate 36 will be drawn taut which will depress spring tensioned snubber 44 to in turn rotate bell crank 50 in a clockwise direction, as viewed in FIGS. 1 and 2. Thus, as shown in FIG. 8 latch lever 136 will be rotated counterclockwise to release the gear carrier plate 108 for counterclockwise rotation about pin 130. Ear 238 on gear carrier plate 108 thereupon swings to the right so that it no longer blocks upward movement of cross bar 220 on shutoff lever 200. However, arm 232 of the film sensor 72 will still be in position to block such movement of lever 200.

The rotation of gear carrier plate 108 is limited by non-extensible belt 118 being drawn taut between hub 114 of drive clutch 112 and pulley wheel 120 of idler pulley 104. Thus the continued forward drive of drive shaft 100 now results in reverse rotation of supply spindle 24 to rewind filmstrip 32 onto supply reel 28.

In rotating gear carrier plate 108 in a counterclockwise direction about pin 130, lug 168 in slot 164 of bell crank 162 will be displaced downwardly. Hence, bell crank 162 will be rotated in a clockwise direction about its axis, engaging lug 174 of gate bracket 176 to thereby displace gate bracket 176 laterally so that, as shown in FIG. 11, the fingers 182 of gate bracket 176 will displace the pressure pad 62 away from the aperture plate 64.

Filmstrip 32 will thus be guided by the outer surfaces of protuberances 192 and 194 so as to be displaced laterally out of engagement with pulldown mechanism 70, which mechanism is still being actuated in the forward direction. It should be noted, that if the operator for any reason reverses the direction of rotation of the drive shaft 100 before rewind has been completed, the gate 36 will not close on the moving filmstrip 32 because, once unlatched, gear carrier plate 108 can be returned to its latched position only upon release of the reset slide 98 by shutoff lever 200 and sensor 72 will still retain lever 200 in its clockwise position. Further, drive clutch 112 will uncouple the supply spindle 24 from the drive; and, as pinion gear 126 of idler pulley will not be coupled to gear 124, no driving movement will be imparted to filmstrip 32 and it will merely come to rest with the gate still in the open position.

Referring again to FIG. 8, once the end of filmstrip 32 passes through that portion of the path which contains film sensor 72, shutoff lever 200, under the action of spring 226, will be free to urge arm 232 of film sensor 72 downwardly against the lighter bias of spring 234 so that sensor arm 230 and 232 will take the position shown at 230' and 232' in FIG. 4. Shutoff lever 200 will therefore be released and will continue to swing counterclockwise to move the upper end of its cross arm 220 into engagment with ratchet wheel 128 on idler pulley 106. As idler pulley 106 is rotating in a clockwise direction, cross arm 220 will engage one of the teeth and be displaced laterally, ear 222 of shutoff lever 200 sliding in slot 224 to permit such movement. Ear 240 of shutoff lever 200 will engage edge 242 of reset slide 98 and move it laterally so that detent 212 of reset slide 98 will no longer engage ear 86, thereby releasing the slide. The tension of spring 138 which is urging gear sector 146 in a clockwise direction will thereupon vertically displace reset slide 98 upwardly so that lug 216 located thereon will move upwardly to engage rubber-covered lug 218 of gear carrier plate 108, rotating the carrier plate in a clockwise direction about pin 130 until lug 154 will again be latched to detent 150 of latch lever 136.

Simultaneously, shoulder 248 on vertically moving reset slide 98 will carry ear 240 of lever 200 upwardly to rotate lever 200 in a clockwise direction about ear 222 and back to its FIG. 3 position. Cross arm 220 will therefore be swung downwardly and out of engagement with ratchet wheel 128 while rotation of gear carrier plate 108 will again couple pinion gear 121 of idler pulley 104 to gear 116, and pinion gear 126 of idler pulley 106 to gear 124. Bell crank 162 will simultaneously be rotated clockwise about its axis to laterally displace gate bracket 176 to thus reposition pressure pad 62 relative to aperture plate 64 as shown in FIG. 10.

Thus, all of the mechanisms described hereinabove will be returned to their original positions as shown in FIG. 3, and the apparatus will be reset in its OFF position, ready for a new cycle of operation.

It will be seen that the invention embodied in the above described apparatus provides means for automatically rewinding an elongated web onto a supply reel when the end of the web is reached and before it pulls off said reel. The operation of this apparatus depends upon the innermost end of the web being fastened to the hub of the supply reel so that when the last convolution of the web is unwound from the supply reel, the reach of the web intermediate the supply and the web driving means will be put under tension and a tension sensing device placed intermediate the supply and the driving means will be moved to actuate the rewind mechanism to return the web to the supply reel. While the preferred embodiment of the present invention has been described as a means for feeding and rewinding a filmstrip in a cinematographic apparatus, it is to be understood that the invention could be used in any type web handling apparatus whose automatic rewind is desired, e.g. sound tape recorders and reproducers, etc.

The invention has been described in detail with particular reference to a preferred embodiment thereof, but it will be understood that variations and modifications can be effected within the spirit and scope of the invention as described hereinabove and as defined in the appended claims.

We claim:
1. In motion picture apparatus including a supply spindle and a take-up spindle adapted respectively to carry film supply and take-up reels, a projection gate, means for guiding film from said supply reel along a predetermined path past said gate and to said take-up reel, a drive shaft, and transmission means normally operatively coupling said take-up spindle to said drive shaft to cause rotation of said take-up spindle in a film-winding direction upon rotation of said drive shaft in a predetermined direction, the improvement wherein:
 (a) said transmission includes a shiftable member movable from a first position providing said normal coupling to a second position wherein said take-up spindle is uncoupled from said drive shaft and said supply spindle is operatively coupled to said drive shaft to cause rotation of said supply spindle in a film-winding direction upon continued rotation of said drive shaft in said predetermined direction; and
 (b) said apparatus further comprises means including a film-tension-sensing means located adjacent said film path for causing movement of said shiftable member from said first to said second position in response to a predetermined tension in film lying in said path.

2. Motion picture apparatus as in claim 1 wherein said supply spindle includes a coaxially mounted pulley wheel adapted for rotation therewith and said shiftable member carries a rotatably mounted idler pulley wheel coupled to said drive shaft and adapted for movement with said shiftable member from said first position to said second position, and further comprising:
(a) a pulley belt embracing said idler pulley wheel and said supply spindle pulley wheel and of such length that in said second position of said shiftable member said pulley belt frictionally drivingly couples said idler pulley wheel and said spindle pulley wheel and in said first position of said gear carrier plate said pulley belt uncouples said idler pulley wheel and said spindle pulley wheel, respectively.

3. Motion picture apparatus as in claim 1 in which said means for sensing a predetermined tension includes:
(a) a snubber biased by a predetermined force into contact with that reach of film of said film path extending from said supply reel to said gate, said snubber being movable responsive to a given force applied thereagainst by a foreshortening of said reach of film due to its being placed under a predetermined tension to cause said shiftable member to move from said first position to said second position.

4. Motion picture apparatus as in claim 3 further comprising:
(a) a channeled passageway for guiding said filmstrip in that portion of the path from said supply reel to said snubber; and
(b) means for halting movement of said film along said portion of said path to cause actuation of said snubber means.

5. In motion picture apparatus including a supply spindle and a take-up spindle adapted respectively to carry film supply and take-up reels, a projection gate, a pulldown mechanism, means for guiding film from said supply reel along a predetermined path past said gate and to said take-up reel, a drive shaft, and transmission means normally operatively coupling said take-up spindle to said drive shaft to cause rotation of said take-up spindle in a film winding direction upon rotation of said drive shaft in a predetermined direction, the improvement comprising:
(a) means for sensing a predetermined tension in that portion of said filmstrip extending from said supply reel to said pulldown mechanism;
(b) means associated with said transmission means and shiftable from a first position to a second position for simultaneously uncoupling said take-up spindle from said drive shaft and drivingly coupling said supply spindle to said drive shaft;
(c) means operatively controlled by said sensing means for moving said shiftable means from said first position to said second position in response to said predetermined tension to cause said filmstrip to be rewound on said supply reel; and
(d) means responsive to movement of said shiftable means to said second position for rendering said pulldown mechanism ineffective to engage said film during said rewind operation.

6. In motion picture apparatus as in claim 5 in which said gate includes a pressure pad and an aperture plate positioned adjacent each other to define a portion of said path for said film, and said pulldown mechanism projects into said portion of said path to operatively engage film located therein, the further improvement wherein said means for rendering said pulldown ineffective comprises:
(a) means operatively responsive to said shiftable means for separating said pressure pad and said aperture plate when said shiftable means moves from said first position to said second position.

7. Motion picture apparatus as in claim 6 in which said aperture plate includes means for holding said film out of the path of movement of said pulldown mechanism when said pressure pad is separated from said aperture plate.

8. In motion picture apparatus including a supply spindle and a take-up spindle adapted respectively to carry film supply and take-up reels, a projection gate, means for guiding film from said supply reel along a predetermined path past said gate and to said take-up reel, a drive shaft, and transmission means normally operatively coupling said take-up spindle to said drive shaft to cause rotation of said take-up spindle in a film winding direction upon rotation of said drive shaft in a predetermined direction, the improvement wherein:
(a) said transmission includes a shiftable member movable from a first position providing said normal coupling to a second position wherein said take-up spindle is uncoupled from said drive shaft and said supply spindle is operatively coupled to said drive shaft to cause rotation of said supply spindle in a film-winding direction upon continued rotation of said drive shaft in said predetermined direction;
(b) said apparatus further comprising means including a film-tension-sensing means located adjacent said film path for causing movement of said shiftable member from said first to said second position in response to a predetermined tension in film lying in said path; and
(c) means including a sensor located adjacent the film path for causing movement of said shiftable member from said second position to said first position in response to passage of the leader end of the film past said sensor during rotation of said supply spindle in a film-winding direction.

9. Motion picture apparatus as in claim 8 in which said means for causing movement of said shiftable member between said positions includes:
(a) means movable to a latched position for exerting a force on said shiftable member to urge said shiftable member from said first position to said second position, and movable to an unlatched position in response to passage of the leader end of the film past said sensor for returning said shiftable member from said second position to said first position.

10. Motion picture apparatus as in claim 9 wherein a spring member operatively connects said movable means to said shiftable member for exerting a force on both said shiftable member and said movable means when said movable means is moved to said latched position.

11. Motion picture apparatus as in claim 10 wherein said movable means includes a lug member adapted to engage and return said shiftable member from said second position to said first position when said movable means is moved from its latched position to its unlatched position by the force of said spring means.

12. Motion picture apparatus as in claim 10 in which said spring member exerts a pivotal force on said movable means for engaging said movable means to a detent in said latched position.

13. Motion picture apparatus as in claim 9 in which said sensor means includes a shutoff lever for unlatching said movable means from said latched position.

14. Motion picture apparatus as in claim 13 wherein said shiftable member carries a rotating member coupled to said drive shaft, and said shutoff lever comprises means for engaging said rotating member for displacing said shutoff lever to unlatch said movable means from said latched position when said shiftable member is in said second position and the leader end of the film moves past said sensor during rotation of said supply spindle in a film winding direction.

(References on following page)

References Cited by the Examiner

UNITED STATES PATENTS

| | | | |
|---|---|---|---|
| 1,210,955 | 1/1917 | Langheck | 40—31 |
| 1,786,917 | 12/1930 | Oehmichen. | |
| 2,914,265 | 11/1959 | Vanderwall | 352—124 X |
| 3,006,240 | 10/1961 | Holler | 352—14 |

FOREIGN PATENTS

| | | |
|---|---|---|
| 1,230,733 | 4/1960 | France. |
| 692,891 | 6/1953 | Great Britain. |

References Cited by the Applicant

FOREIGN PATENTS 245,882   1/1926   Great Britain.

EVON C. BLUNK, *Primary Examiner.*

WILLIAM MISIEK, NORTON ANSHER, *Examiners.*